United States Patent
Passone

(10) Patent No.: US 6,641,207 B1
(45) Date of Patent: Nov. 4, 2003

(54) REINFORCEMENT BAR FOR A MOTOR VEHICLE BODY COMPONENT

(76) Inventor: Pietro Passone, Viale Bruno Buozzi 7, Vinovo (IT), I-10048

( * ) Notice: Subject to any disclaimer, the term of this patent is extended or adjusted under 35 U.S.C. 154(b) by 0 days.

(21) Appl. No.: 10/030,547

(22) PCT Filed: Jul. 10, 2000

(86) PCT No.: PCT/EP00/06522

§ 371 (c)(1),
(2), (4) Date: Mar. 19, 2002

(87) PCT Pub. No.: WO01/03960

PCT Pub. Date: Jan. 18, 2001

(30) Foreign Application Priority Data

Jul. 12, 1999  (IT) .......................... T099A0608

(51) Int. Cl.[7] .................................. B60S 5/04
(52) U.S. Cl. ..................... 296/188; 296/146.6; 52/735.1
(58) Field of Search .............................. 296/146.6, 188; 52/735.1, 731.6; 49/502

(56) References Cited

U.S. PATENT DOCUMENTS 5,743,588 A * 4/1998 Ufrecht ................... 296/146.6
5,887,938 A * 3/1999 Topker et al. ............... 296/188
6,227,609 B1 * 5/2001 Mellis ......................... 296/188
6,416,114 B1 * 7/2002 Topker et al. ............ 296/146.6

FOREIGN PATENT DOCUMENTS

| DE | 24 14 114 A | 10/1974 |
| DE | 43 07 079 A | 9/1994 |
| DE | 296 22 985 U | 10/1997 |
| JP | 61 157 427 A | 7/1986 |
| JP | 4-24118 | * 1/1992 |
| WO | WO 94 07709 A | 4/1994 |

* cited by examiner

Primary Examiner—Joseph D. Pape
(74) Attorney, Agent, or Firm—Sughrue Mion, PLLC

(57) ABSTRACT

The reinforcement bar for motor vehicle body components, in particular an anti-intrusion bar for doors, has in cross-section at least one omega-shape element (10) comprising two horizontal base sections (12) from which extend respective vertical sections (14) joined at the top by a further horizontal section (16), or at least one inverted U-shaped element (28) comprising two vertical sections (14) joined at the top by a further horizontal section (16). The bar has respective longitudinally extending slots (18) in the vertical sections (14) at at least one end in such a way that it allows the end of the bar to be shaped in conformity with the assembly requirements of the motor vehicle body components to re reinforced.

14 Claims, 11 Drawing Sheets

REINFORCEMENT BAR FOR A MOTOR VEHICLE BODY COMPONENT

This is a National stage entry under 35 U.S.C. §371 of application No. PCT/EP00/06522 filed Jul. 10, 2000; the disclosure of which is incorporated herein by reference.

BACKGROUND OF THE INVENTION

The present invention relates to a reinforcement bar for a motor vehicle body component, in particular an anti-intrusion bar for a door, and a process for the production thereof.

SUMMARY OF THE INVENTION

The object of the present invention is to provide a bar of the type indicated above which will be simple and economic to produce and which can be adapted to the various assembly requirements of the components to be reinforced, at the same time guaranteeing the necessary properties of mechanical strength.

This object is achieved by a reinforcement bar and a process for its production having the characteristics set out specifically in the following claims.

BRIEF DESCRIPTION OF THE DRAWINGS

Advantages and characteristics of the present invention will become apparent from the following detailed description, made with reference to the attached drawings provided by way of non-limitative example, in which.

DETAILED DESCRIPTION OF THE INVENTION

Figure 1:
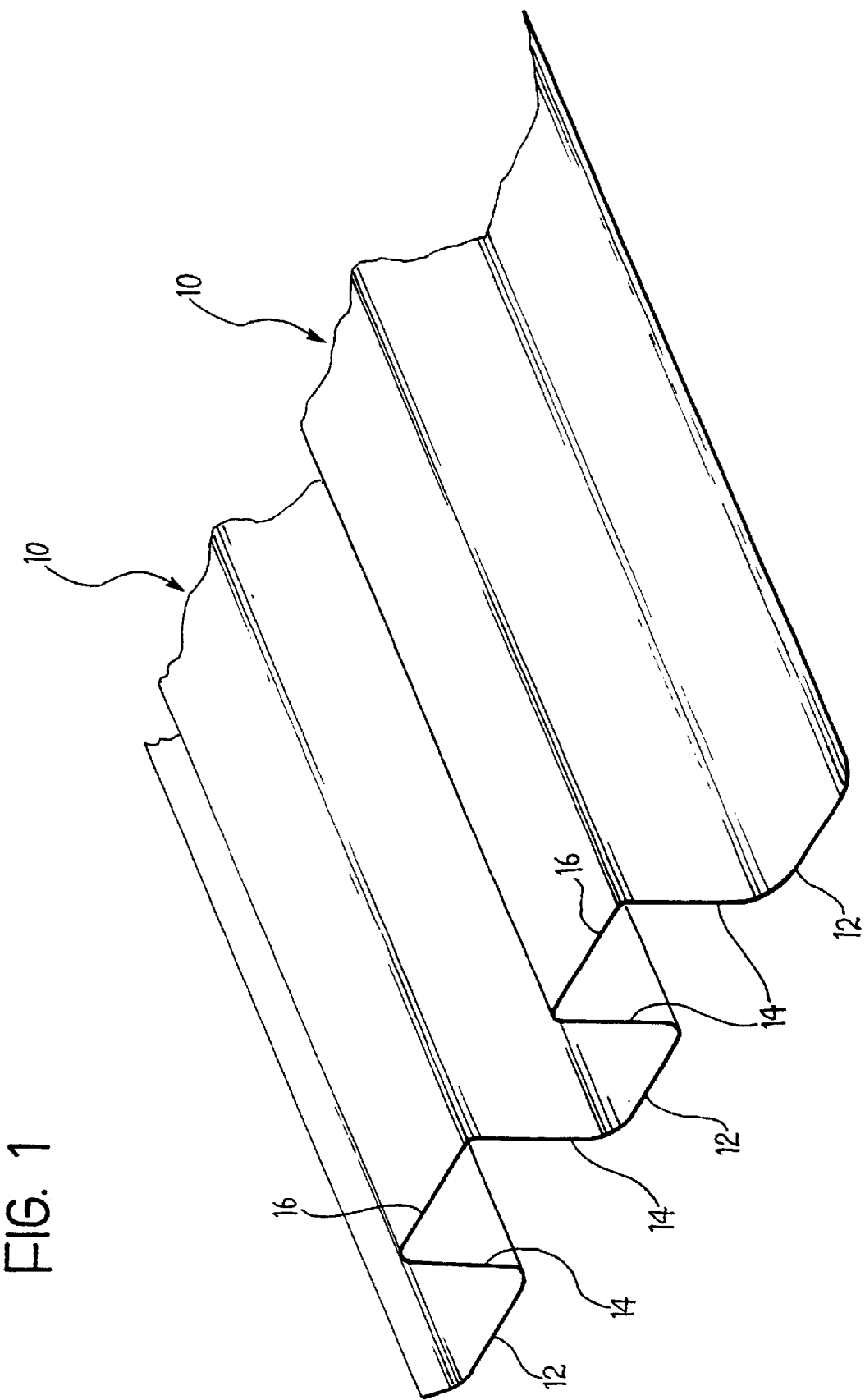
FIGS. 1 to 4 illustrate successive phases in the shaping process for one end of a reinforcement bar of the invention.

In FIG. 1 there is shown one end of a bar obtained with any known technology, for example by pressing or rolling, having in cross-section two adjacent omega shaped elements 10, that is comprising two horizontal base sections 12 from which extend respective vertical sections 14 joined at the top by a further horizontal section 16. Two adjacent elements 10 have a horizontal base section 12 in common.

Figure 2:
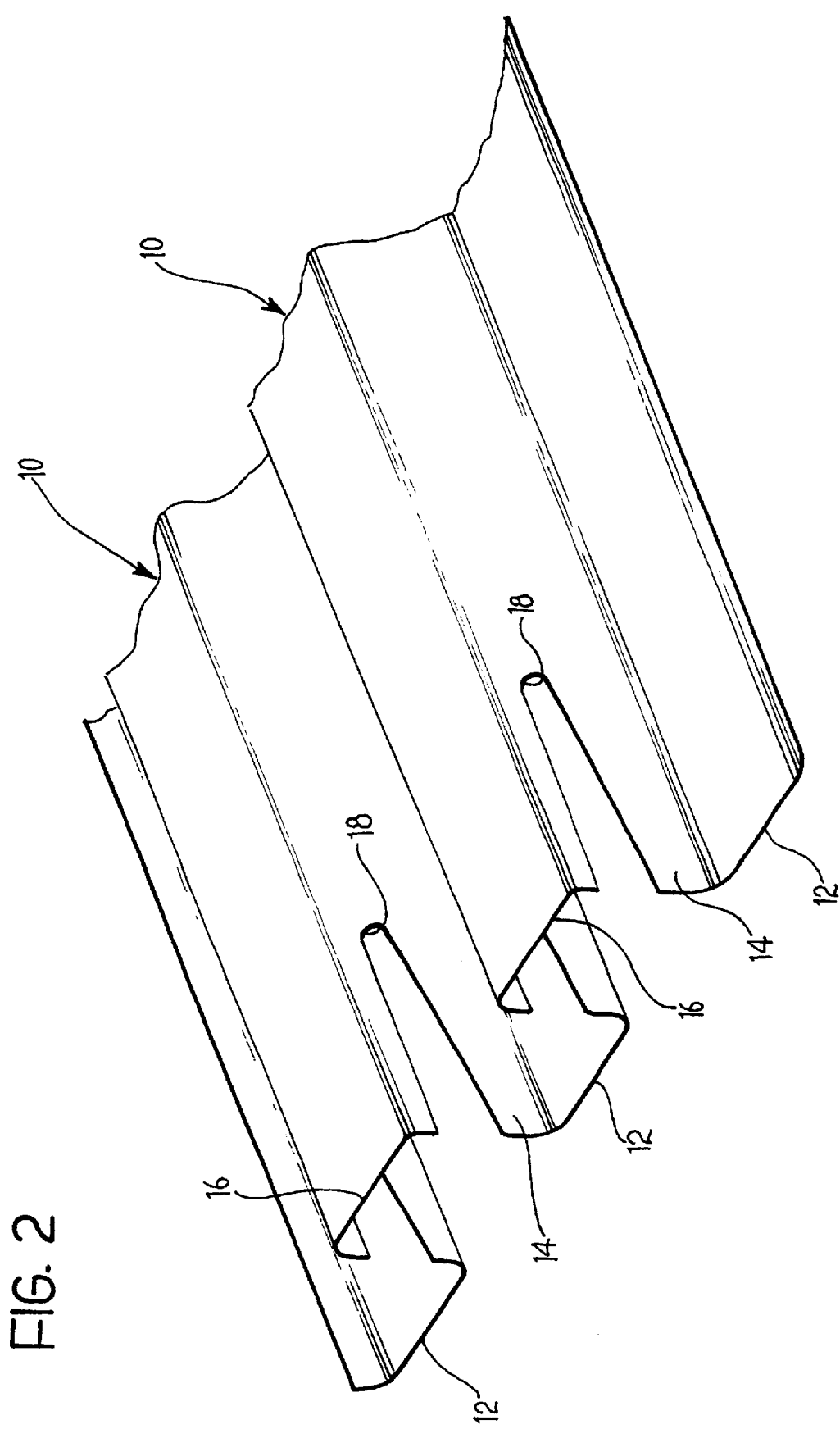

In the vertical sections 14 at the end of the bar there are formed (FIG. 2) respective longitudinally extending slots 18. Naturally it is intended that the opposite end of the bar, not illustrated in the drawings, may also be subjected to this operation, as well as those subsequently described.

Figure 3:
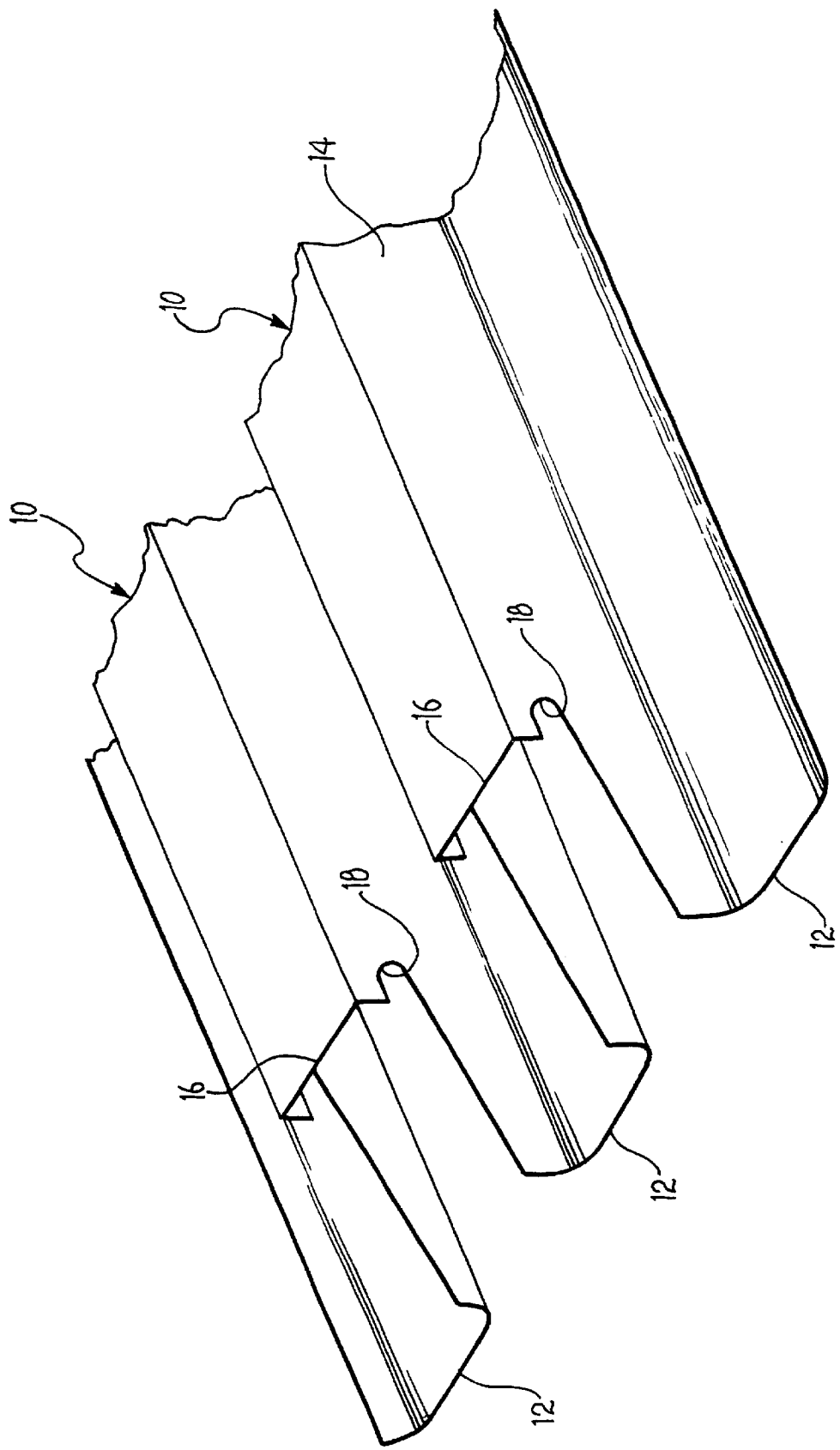
Figure 4:
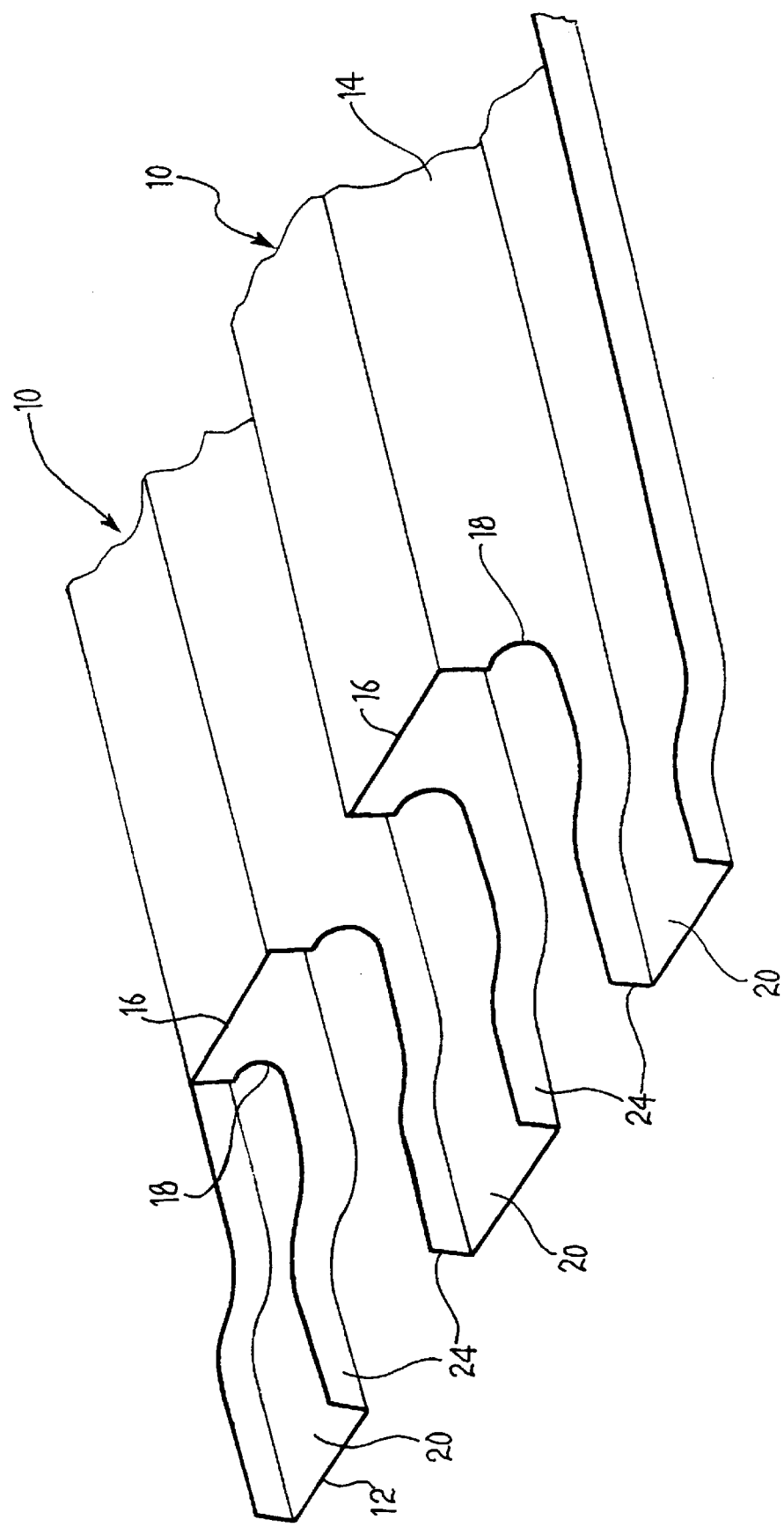

Then (FIG. 3) a longitudinally extending end portion of the further horizontal section 16 of each omega shape element 10 is removed, in such a way as to allow the shaping (FIG. 4) by bending of the corresponding longitudinally extending portions 20 of the horizontal base sections 12 towards the general plane of the bar. This shaping can be adapted to the specific assembly requirements of the bar on a motor vehicle body component which is to be reinforced thereby. Therefore, in an embodiment of the invention not illustrated this could alternatively be shaped in such a way as to cause the portions 20 to be spaced from the general plane of the bar.

In a variant embodiment of the bar of the invention (FIG. 5) there is formed a drawing 22 on the end portion of each further horizontal section 16. In this way the mechanical strength of the end of the bar is increased and the height dimension of the drawn portion is reduced as may be needed by particular assembly requirements.

Figure 6:
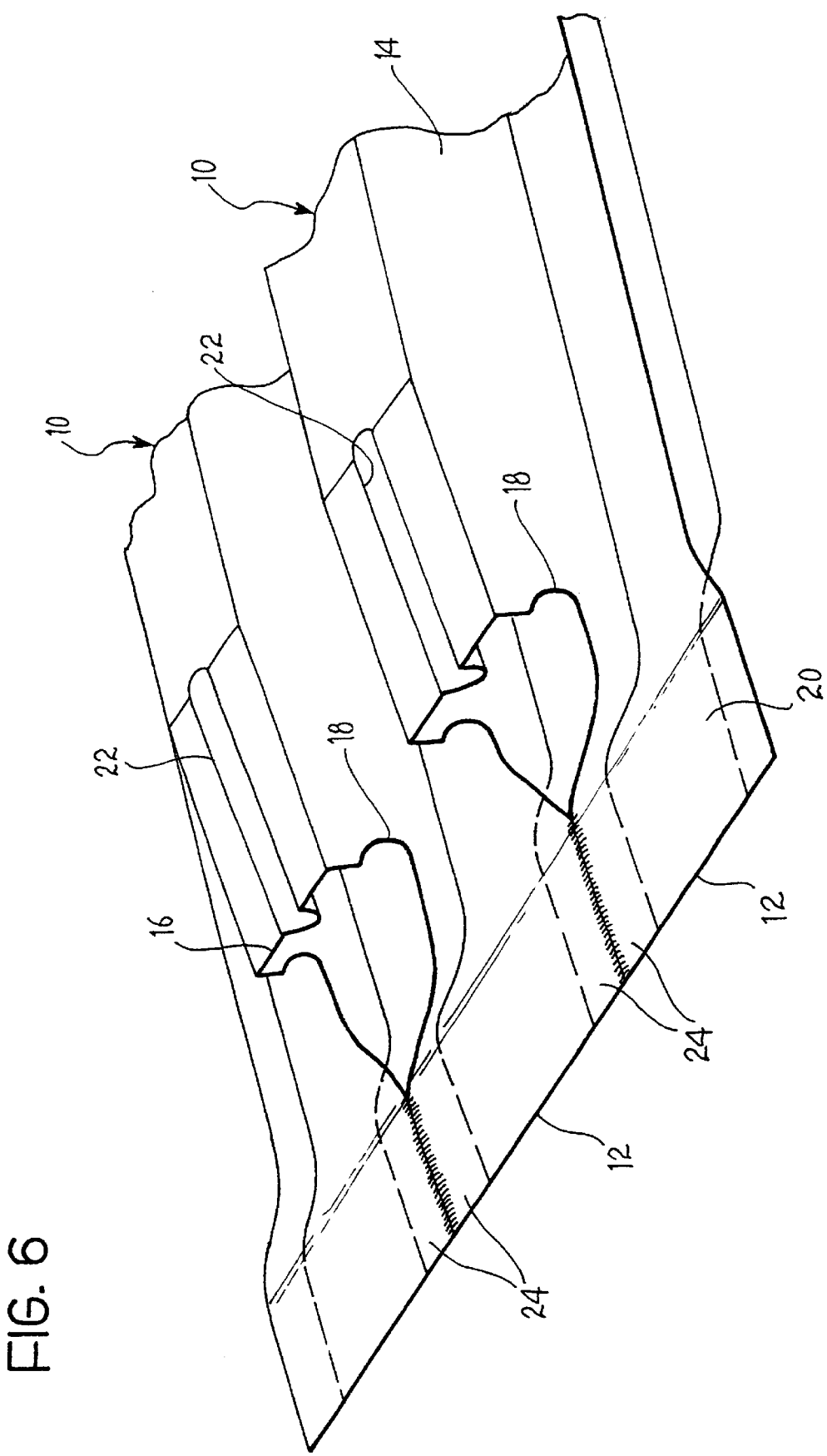

In a further embodiment of the bar of the invention (FIG. 6) the portions 24 of the vertical sections 14, which are integral with the corresponding portions 20 of the horizontal base sections 12 after forming the slots 18, are folded in such a way as to lie substantially in the same plane as the portions 20 of the horizontal base sections 12, and welded together.

In a further embodiment of the bar of the invention (FIG. 7) a longitudinally extending end portion of the further horizontal section 16 of each omega-shape element 10, of length less than that in the preceding case is removed. The end portion 26 of the further horizontal section 16 of each omega-shape element 10 is then folded towards the end portion 20 of the horizontal base sections 12 and welded to it, significantly increasing the mechanical strength of the end of the bar.

In this case the residual integral portions 24 (see FIG. 5) of the vertical sections 14 remaining with the corresponding portions 20 of the horizontal base sections 12 after the slots 18 have been formed, have been eliminated.

Figure 5:
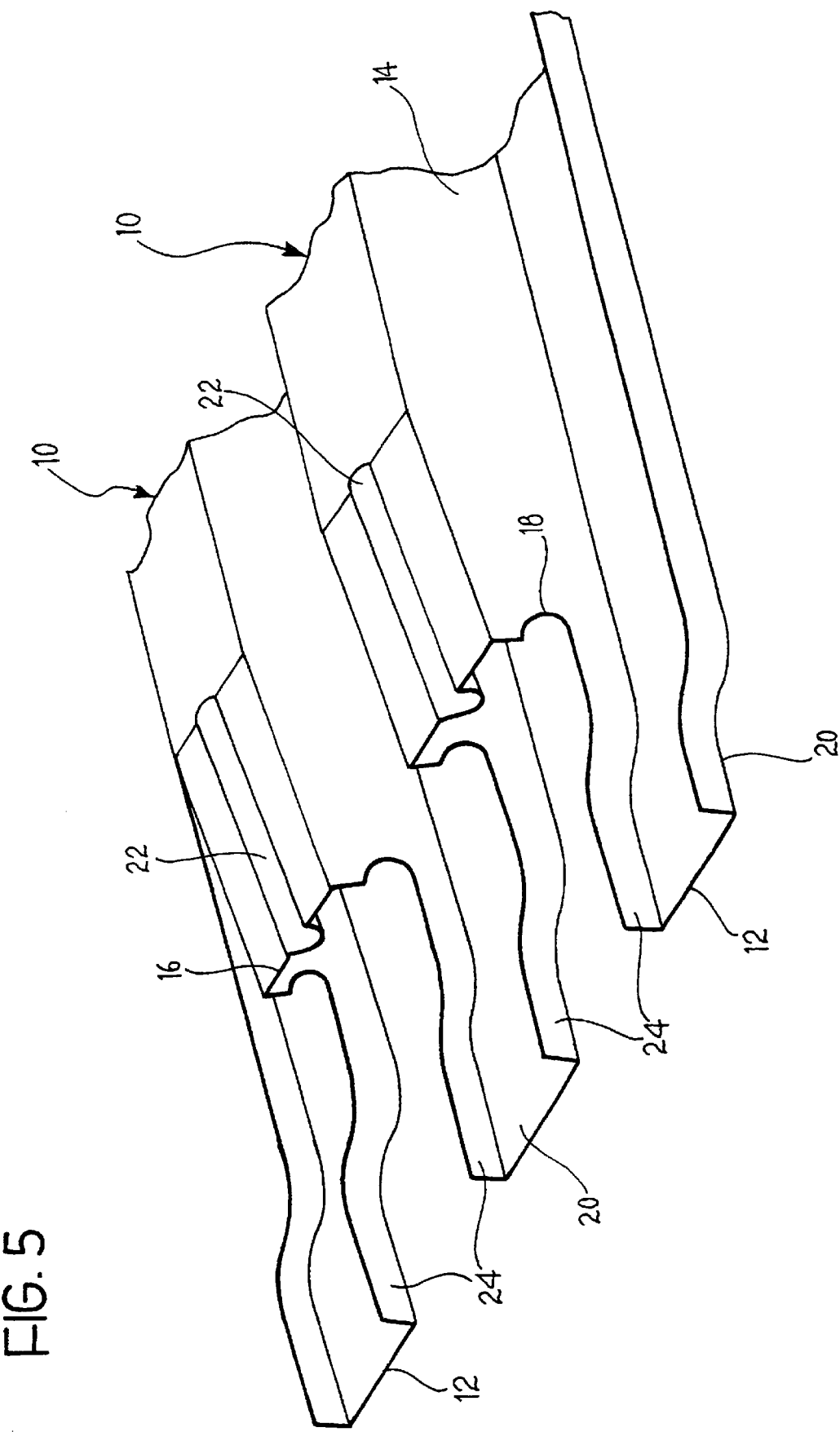
FIGS. 5 to 11 illustrate respective variant embodiments of one end of a bar of the invention.
Figure 7:
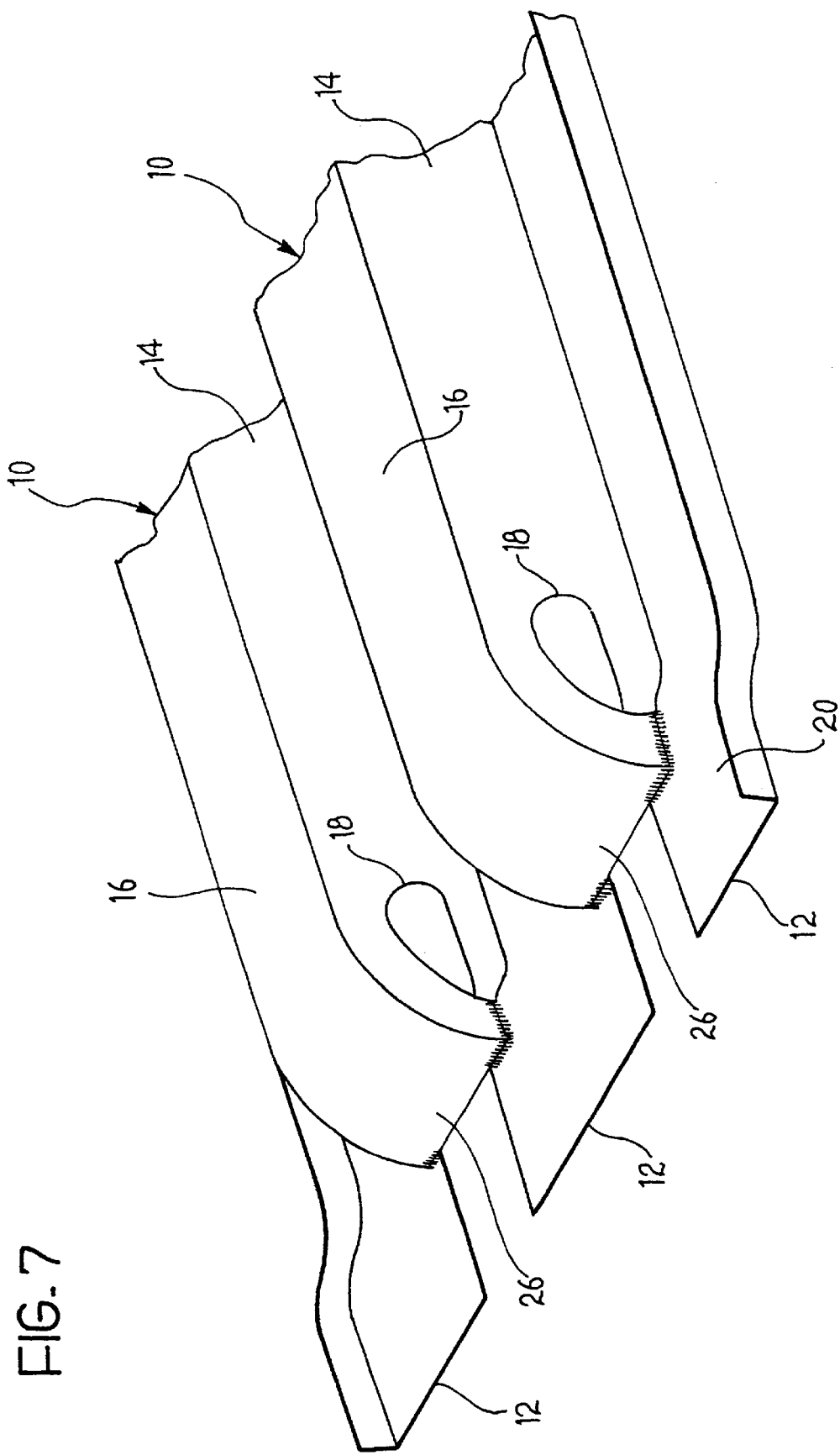

In a further embodiment of the bar of the invention (FIG. 8)—otherwise having characteristics corresponding to those of FIG. 7—a drawing 22 is formed on the end portion 26 of each further horizontal section 16, obtaining the advantages already indicated in relation to the variant embodiment of FIG. 5.

Figure 8:
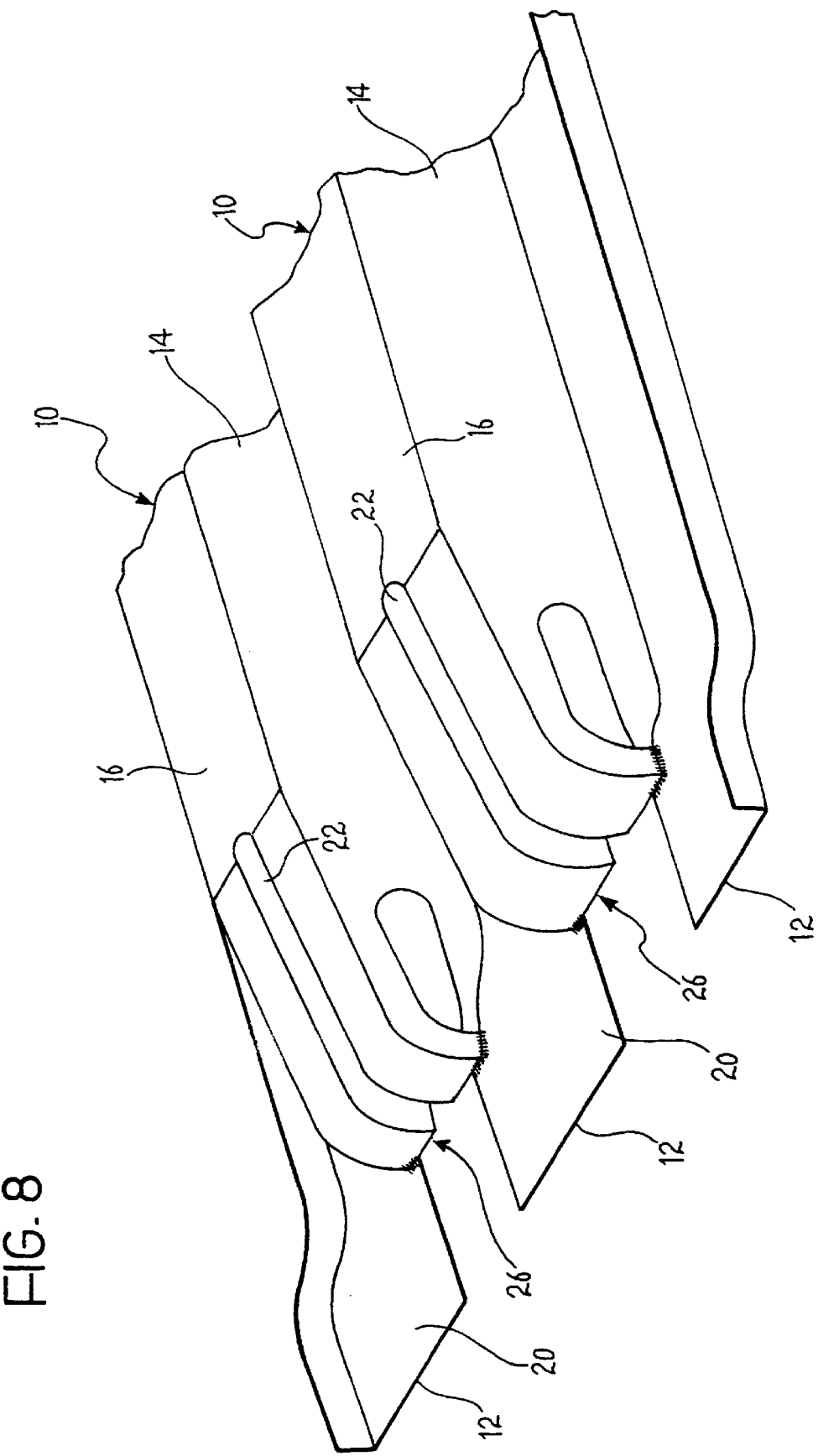

In a further variant embodiment of the bar of the invention (FIG. 9)—otherwise corresponding to that of FIG. 8—the residual portions 24 of the vertical sections 14 remaining integral with the corresponding portions 20 of the horizontal base sections 12 after formation of the slots 18, are folded in such a way as to lie substantially in the same plane as the portions 20 of the horizontal base sections 12 and welded thereto.

Figure 9:
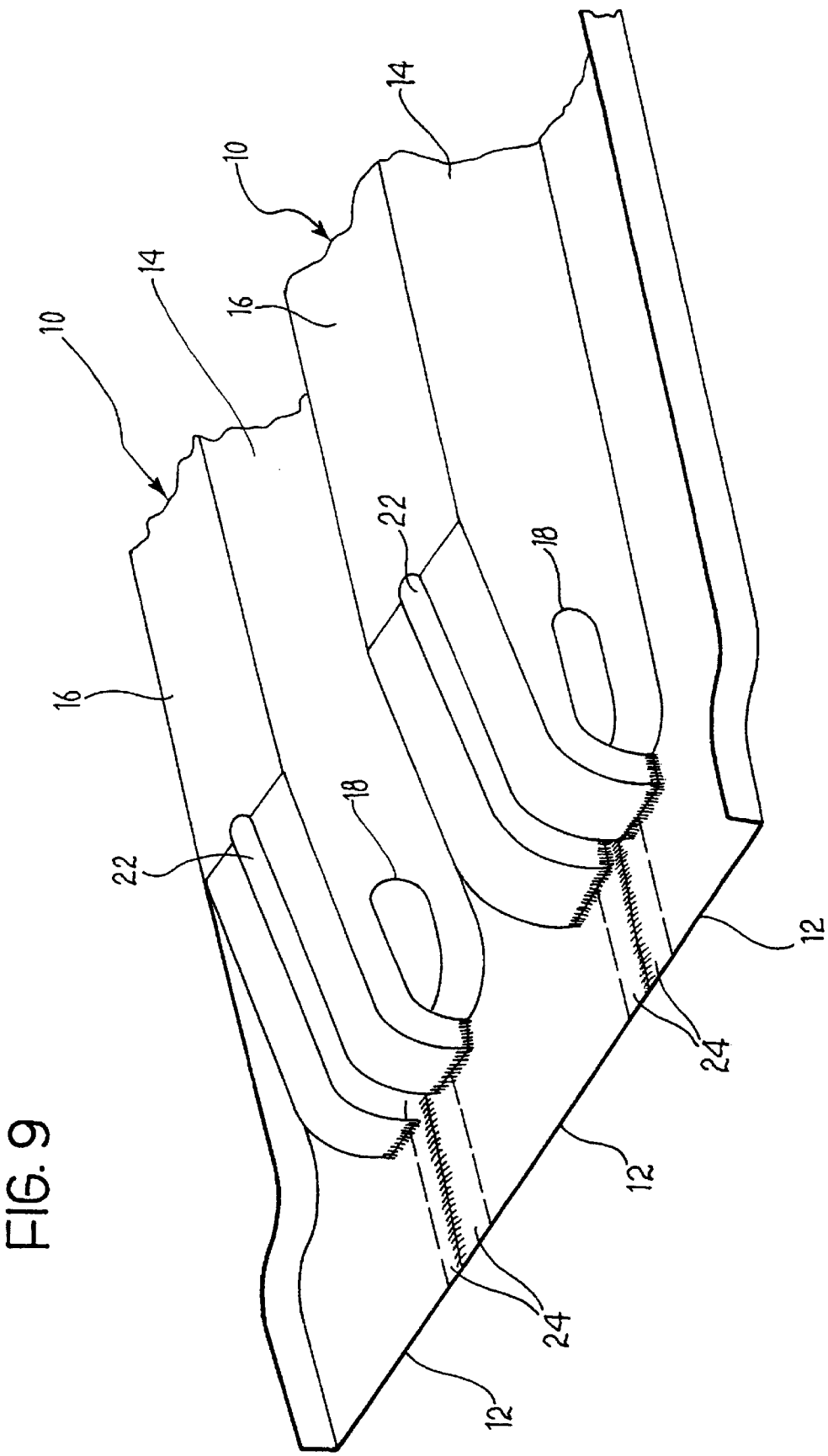
Figure 10:
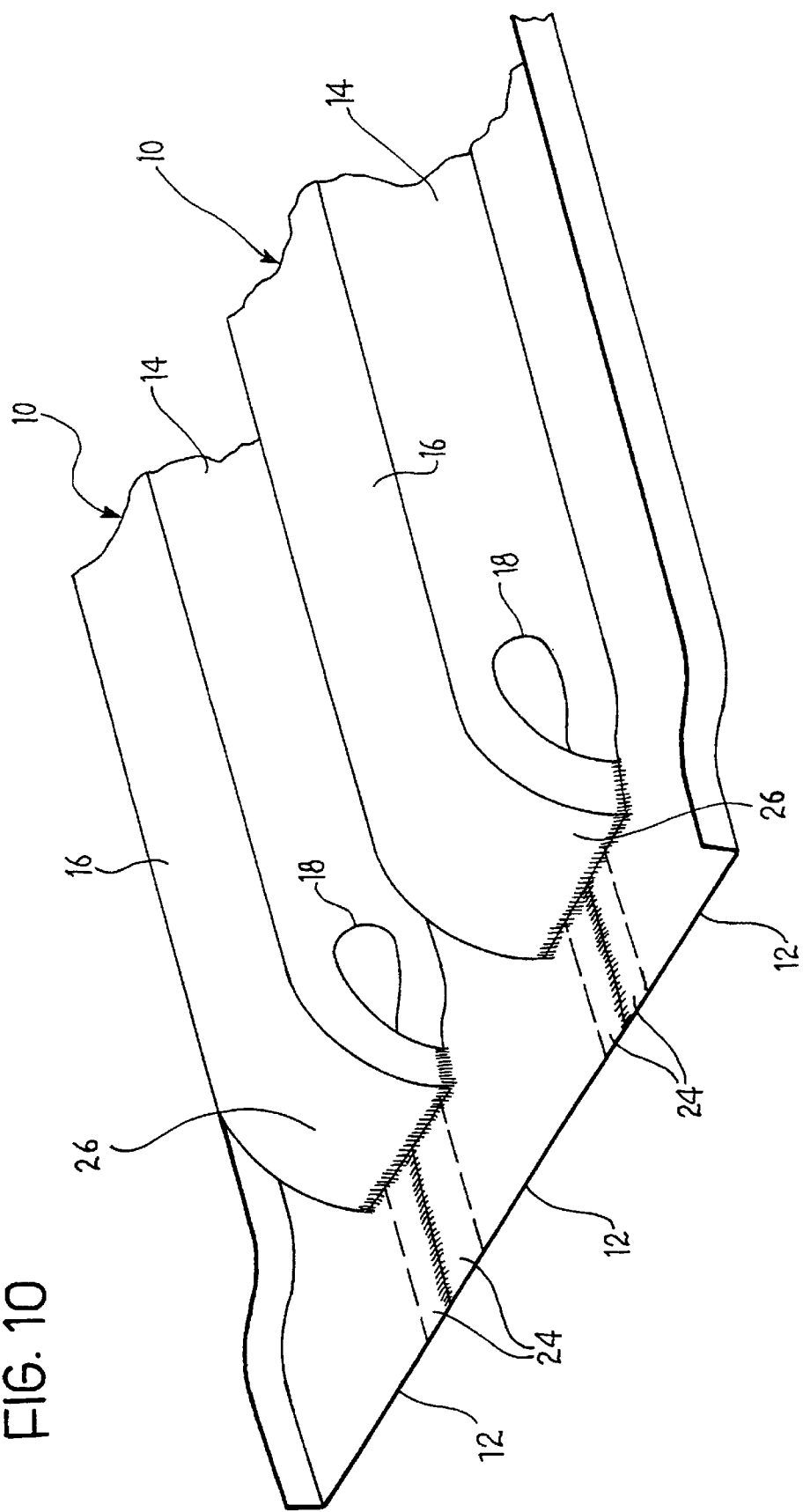

A further variant embodiment of the bar of the invention (FIG. 10) corresponds to that of FIG. 9 with the absence of the drawings 22 on the end portion 26 of each further horizontal section 16.

Figure 11:
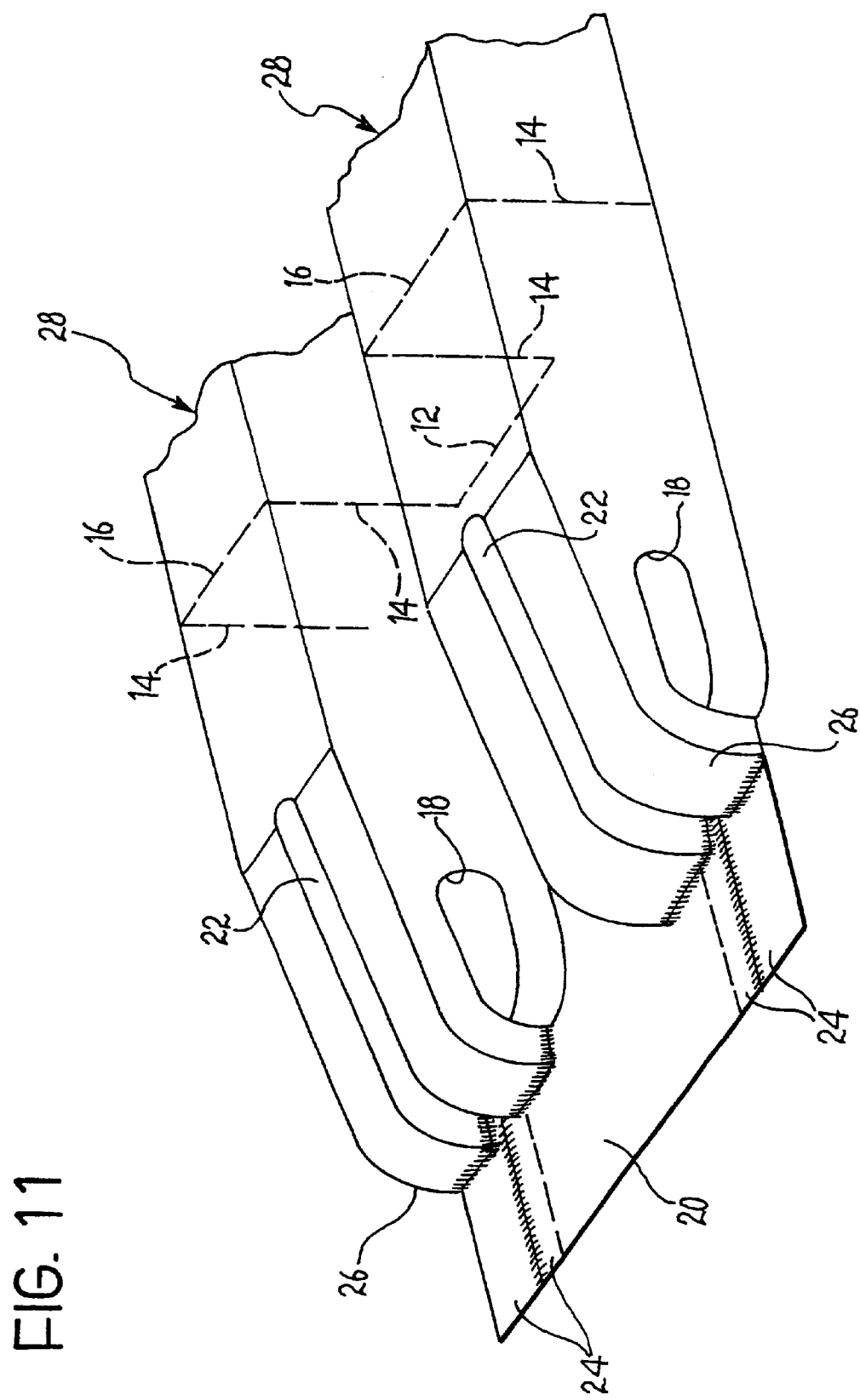

A further variant embodiment of the bar of the invention (FIG. 11) corresponds substantially to that of FIG. 9 with the difference that, in this case—instead of starting from a bar having two omega-shape adjacent elements in cross-section—it starts from a bar having two inverted U-shape elements 28 connected together by a horizontal base section 12. Each U-shape element has, like the central part of the omega-shape elements 10 previously described—two vertical sections 14 connected by a further horizontal section 16.

In this case, too, the presence of the slots 18 extending longitudinally along the vertical sections 14 makes it possible to effect a desired shaping of the end of the bar.

Bars having ends shaped corresponding to those illustrated in FIGS. 6, 7, 8 and 10 can similarly be formed starting from a bar having two inverted U-shape elements 28 in section connected together by a horizontal base section 12.

From the above-described exemplary embodiments the versatility of the bar of the invention will be apparent, the ends of which bar can be shaped in such a way as to be adapted to the widest variation in requirements of use. This versatility is further accentuated by the fact that the two ends of the bar can be shaped differently from one another. Moreover, the present invention is not dependent on the material utilised for the bar such that the material can be chosen with the most complete freedom.

Naturally, the principle of the invention remaining the same, the details of construction and the embodiments can be widely varied with respect to those described purely by way of example, without by this departing from its ambit. In particular, the bar may comprise any number of omega elements or inverted U-shape elements combined together. Moreover it is clear that the terms "horizontal" and "vertical" as utilised in the present description must be interpreted as meaning "approximately horizontal" and "approximately vertical", and do not necessarily refer to the spatial location in use of the bar.

What is claimed is:

1. A reinforcement bar for motor vehicle body components, having in cross-section at least one omega-shape element (10) comprising two horizontal base sections (12) from which extend respective vertical sections (14) joined at the top by a further horizontal section (16), or at least one inverted U-shaped element (28) comprising two vertical sections (14) joined at the top by a further horizontal section (16), said bar having at least one end with vertical sections (14) having respective longitudinally extending slots (18) therein such that said end of the bar can be shaped to conform to assembly requirements for the motor vehicle body component to be reinforced.

2. A bar according to claim 1, having respective longitudinally extending slots (18) in said vertical sections (14) at both ends.

3. A bar according to claim 1, having in section a plurality of omega-shape elements (10) adjacent one another and having a horizontal base section (12) in common.

4. A bar according to claim 1, in which a longitudinally extending end portion of said further horizontal section (16) has been removed, allowing shaping of the corresponding longitudinally extending portions (20) of the horizontal base sections (12) towards the general plane of the bar.

5. A bar according to claim 4, in which the end portion of said further horizontal section (16) has a drawing (22).

6. A bar according to claim 4, in which at least one residual portion (24) of the vertical section (14) which remains integral with the corresponding portions (20) of the horizontal base sections (12), after formation of the slots (18), has been folded in such a way as to lie substantially in the same plane as said portions (20) of the horizontal base sections (12).

7. A bar according to claim 1, in which an end portion (26) of the said further horizontal section (16) is folded towards end portions (20) of the horizontal base sections (12).

8. A bar according to claim 7, in which the end portion (26) of said further horizontal section (16) folded towards the end portions (20) of said horizontal base sections (12) is welded thereto.

9. A process for the production of a reinforcement bar having in section at least one omega-shape element (10) comprising two horizontal base sections (12) from which extend respective vertical sections (14) joined at the top by a further horizontal section (16), or at least one inverted U-shaped element (28) comprising two vertical sections (14) joined at the top by a further horizontal section (16), said process involving the formation of respective longitudinally extending slots (18) in said vertical sections (14) at at least one end of a bar, and shaping said end of the bar in conformity with assembly requirements for the motor vehicle body component to be reinforced.

10. A process according to claim 9 which provides, after forming the slots (18), for removal of a longitudinally extending end portion of said further horizontal section (16) and, subsequently, bending corresponding longitudinally extending portions (20) of the horizontal base sections (12) towards the general plane of the bar.

11. A process according to claim 10, which includes forming a drawing (22) said further horizontal section (16).

12. A process according to claim 10, in which at least one of the portions (24) of the vertical section (14) remaining integral with the corresponding portions (20) of the horizontal base sections (12), after the slots (18) have been formed, is folded in such a way as to lie substantially in the same plane as the said portions (20).

13. A process according to claim 10, in which the end portion (26) of the said further horizontal section (16) is folded towards the end portions (20) of the horizontal base sections (12).

14. A process according to claim 13, in which the end portions (26) of said further horizontal sections (16) folded towards the end portions (20) of the horizontal base sections (12) are welded to them.

* * * * *